No. 737,154. Patented August 25, 1903.

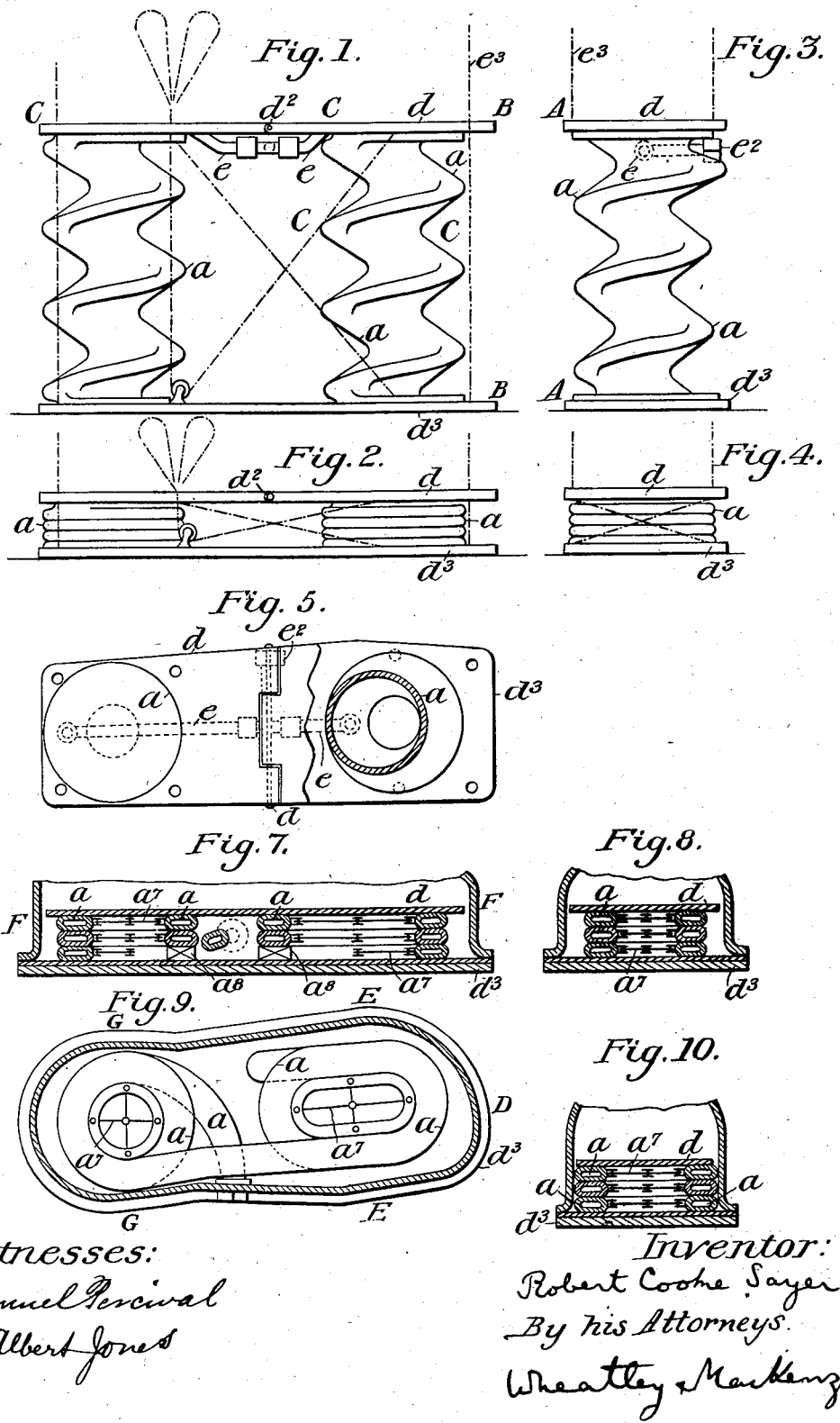

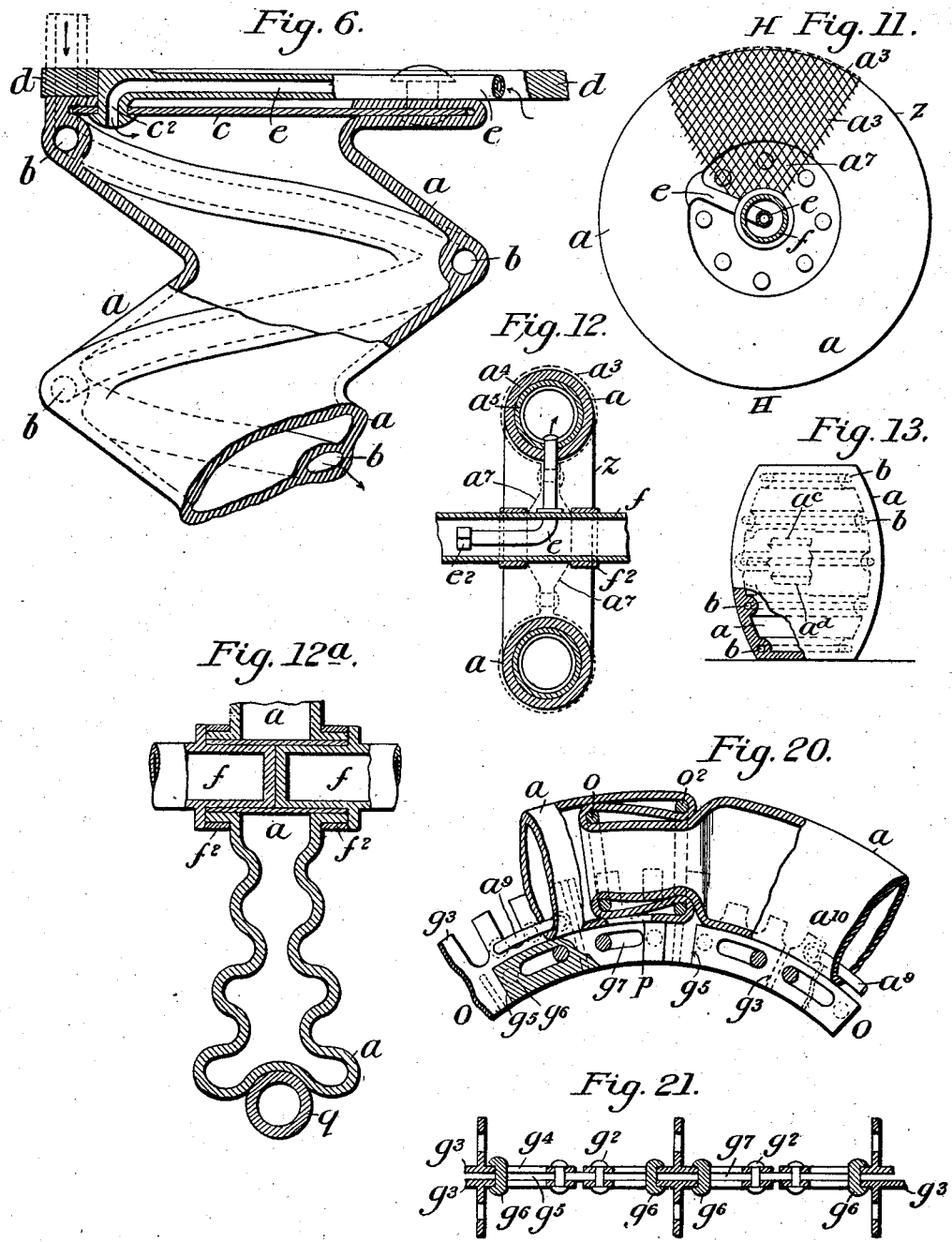

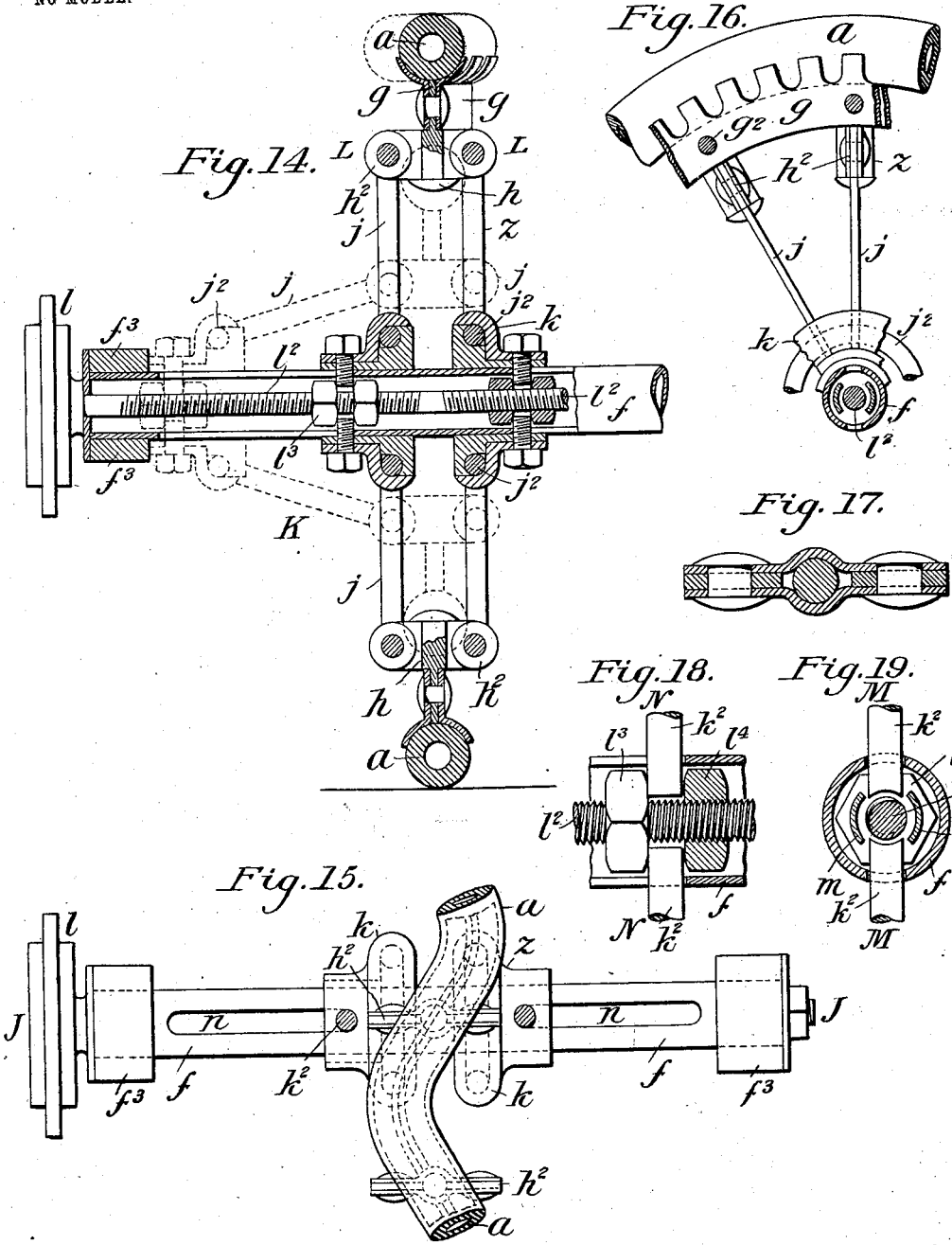

UNITED STATES PATENT OFFICE.

ROBERT COOKE SAYER, OF BRISTOL, ENGLAND.

CONVOLUTE PRESSURE-BEARING.

SPECIFICATION forming part of Letters Patent No. 737,154, dated August 25, 1903.

Application filed September 15, 1902. Serial No. 123,545. (No model.)

*To all whom it may concern:*

Be it known that I, ROBERT COOKE SAYER, a subject of the King of Great Britain and Ireland, residing at 11 Clyde road, Redland, Bristol, England, have invented certain new and useful Improvements in Convolute Pressure-Bearings; and I do hereby declare the following to be a full, clear, and exact description of the invention, such as will enable others skilled in the art to which it appertains to make and use the same.

The object of this invention is to utilize fluid-pressure as an adjustable elastic bearing for weights or loads; and it essentially consists of open or closed convolute, spiral, or corrugated vessels, able by the regulation of the pressure within them to have their forms, shapes, or positions altered to suit varying circumstances.

Figure 1 is an elevation at A A, Fig. 3, showing the invention adapted for elevating the human body; Fig. 2, the same when contracted; Fig. 3, an elevation at B B, Fig. 1; Fig. 4, the same when contracted; Fig. 5, a sectional plan at C C C C, Fig. 1; Fig. 6, a detail in sectional elevation of Fig. 1, having an auxiliary vessel; Fig. 7, a section at D D, Fig. 9, of a vessel adapted for the feet of bipeds and quadrupeds; Fig. 8, a section at E E, Fig. 9; Fig. 9, a sectional plan at F F, Fig. 7; Fig. 10, a section at G G, Fig. 9; Fig. 11, the elevation of a wheel with the vessel acting as its diaphragm; Fig. 12, a section at H H, Fig. 11; Fig. $12^a$, in part the same, showing in detail a larger wheel; Fig. 13, a sectional elevation showing the invention typically for other shapes; Fig. 14, in part a section on line J J, Fig. 15, showing a vessel adapted as a spiral tire of a wheel; Fig. 15, in part a plan of Fig. 14, showing the tire at its greatest extension developed; Fig. 16, in part a sectional elevation at K K, Fig. 14; Fig. 17, a section at L L, Fig. 14; Fig. 18, a section at M M, Fig. 19. Fig. 19 is a section at N N, Fig. 18; Fig. 20, in part a sectional elevation of a straight-tire vessel having its convolutions inside; Fig. 21, a section at O O, Fig. 20, developed.

The drawings illustrate the invention typically, similar parts being shown by similar letters.

The convolute, spiral, or corrugated vessel $a$ when closed is shaped as or provided with auxiliary vessels $b$, Figs. 6 and 13, where $b$ is formed in double spirals or is single, Figs. $12^a$, 14, where the vessel $a$ forms the diaphragm of a wheel $z$, or in groups, Figs. 1 to 10, where the vessel $a$ is an open or closed tube according to its load, and the pressure is able to expand the vessels singly or together, or the formation of more or less vacuum in either contracts them, and by retaining the pressure in one or more when one or more are exhausted or have a vacuum they fold themselves up automatically, as shown by Figs. 2, 4, and, as in part shown dotted on Fig. 13, where the top has been reduced to $a^c$ and the bottom to $a^d$, or the pressure against the surfaces in contact is modified, as shown by Figs. 7 to 10, to ease the bearings of animals and, Figs. 15 and 20, to slacken the pressure in $a$ to give ease in the alterations of its spirals or folds.

When the vessel $a$ is open, increased load drives atmospheric air out of it and reduced load allows the pressure to reëxpand it, the extent of the opening being regulated by a known means—say a tapering or wedge-shaped aperture closed more or less by a screwed nut attached similarly to the union $e^2$, Figs. 3 and 5, as follows below. The pressures used are various, as required, and for structures in compression, liquid, or when lightness is required the vessel $a$ receives gaseous pressure and its auxiliaries $b$ liquid. The vessel $a$ and also $b$, when required, receive free elastic dust, granules, pellets, or flakes (not shown) that will not pass the pump-valves that exhaust them to prevent leakage should a puncture occur.

Figs. 1 to 6 show the adaptation of the vessel $a$ to raise the human body when formed as a screw, or it is corrugated annularly with or without auxiliaries $b$, Fig. 6, secured to soles $d$ and $d^3$ by plates $c$ and rivets $c^2$, hinged at $d^2$, and provided with pipes $e$, connecting the vessels $a$ and unions $e^3$, at which to attach a pump to charge or create a vacuum in $a$. They are secured by strings $e^3$ or otherwise. For the normal wear of bipeds or quadrupeds, Figs. 7 to 10, the vessel $a$ is a single tube formed into several layers of coils retained in position by diaphragm-ties $a^7$ and elastic blocks $a^8$ to fill spaces for the foot to bear on, as shown, but without $a^8$ when one layer only of tube is used which is wholly or in part secured to the sole. When required, auxiliary coils $b$ or tubes (not shown) are used above and at the side of the foot and $a$ and $b$ are inclosed, as shown, or partly open.

Figs. 11, 12, and 12ª show an adaptation of the vessel $a$ as the diaphragm of a wheel $z$. It is corrugated, Fig. 12ª, as shown, annularly and carries one (as shown) or more straight tires of any description; but when it is required for the tire $a$ of the wheel $z$ to be much reduced or enlarged it is corrugated annularly and also radially, and when at a minimum radius at the periphery the corrugations are bridged by the tire $a$ and at the center the diaphragm-walls of $a$ are made to traverse the axle $f$, as follows.

Figs. 14 to 21 show a modification of the vessel $a$ as a spiral tire of a wheel $z$, which is carried by any means able to retain it in position either straight or, as shown, Fig. 15, in a spiral position, and able to contract the wheel to smaller radii and increase the width of the tire foldings, as indicated by the dotted lines, Fig. 14, for which the vessel $a$ is carried by spring-serrated plates $g$, secured together and to the tire $a$ by rivets $g^2$ and carried on swivels $h$, hinged at $h^2$ to rods $j$, which are hinged at $j^2$ to collars $k$, able to slide on the axle $f$, which is carried in bearings $f^3$. When traversed, by turning a pinion $l$ to rotate a screw-shaft $l^2$ within the axle $f$ to traverse the screw-nuts $l^3$ and $l^4$ the bolts $k^2$ in the slots $n$ and the collars $k$, $l^3$, and $l^4$ are kept from turning by the straps $m$ and $m^2$, secured to the bearings $f^3$. When the tire vessel $a$ is required to be straight in plan at all times and not a spiral exteriorly, it is convoluted or folded inside, Figs. 20 and 21, and, as above, carried on the plates $g$, that the length of the straight tire $a$ and its plates $g$ may be varied by the parts, and their actions described above, $g$, are formed in several lengths, $g^3$ having slots $g^4$ and connected by bolts $g^2$ and $g^5$, having bolt ends $g^6$ to pass through the slots $g^4$ and connect $g^3$ and $g^5$ and slots $g^7$ for the bolts $g^2$, and thereby telescope or sandwich the plates $g^3$ $g^5$ and the tube $a$ to slide on one another. $a$ is secured each side by wires or straps $a^9$ and rivets $a^{10}$ to $g^3$, and elastic friction-ring rollers $o$ and $o^2$ inserted through an opening $p$ ease the folding.

What I claim, and desire to secure by Letters Patent, is—

1. A vessel or tube having convolutions, spirals or corrugations that render it expandible and contractible, a means to regulate the extent of the opening and thereby the pressure in the vessel, and a means for holding the vessel in contact with its bearing-surfaces for carrying light loads.

2. A vessel or tube having convolutions, spirals or corrugations that render it expandible and contractible and a means of pumping more or less fluid-pressure into it, or exhausting atmospheric pressure from it to expand or contract its walls, and the amount of its convolutions, spirals or corrugations, and a means for holding the vessel in contact with its bearing-surfaces for carrying heavy loads.

In testimony whereof I have affixed my signature in presence of two witnesses.

ROBERT COOKE SAYER.

Witnesses:
LIONEL A. WILSON,
CHARLES E. RICKETTS.